J. KING.
AUTOMATIC BUFFER COUPLING FOR RAILWAY VEHICLES.
APPLICATION FILED SEPT. 15, 1919.
1,335,061.
Patented Mar. 30, 1920.
2 SHEETS—SHEET 1.
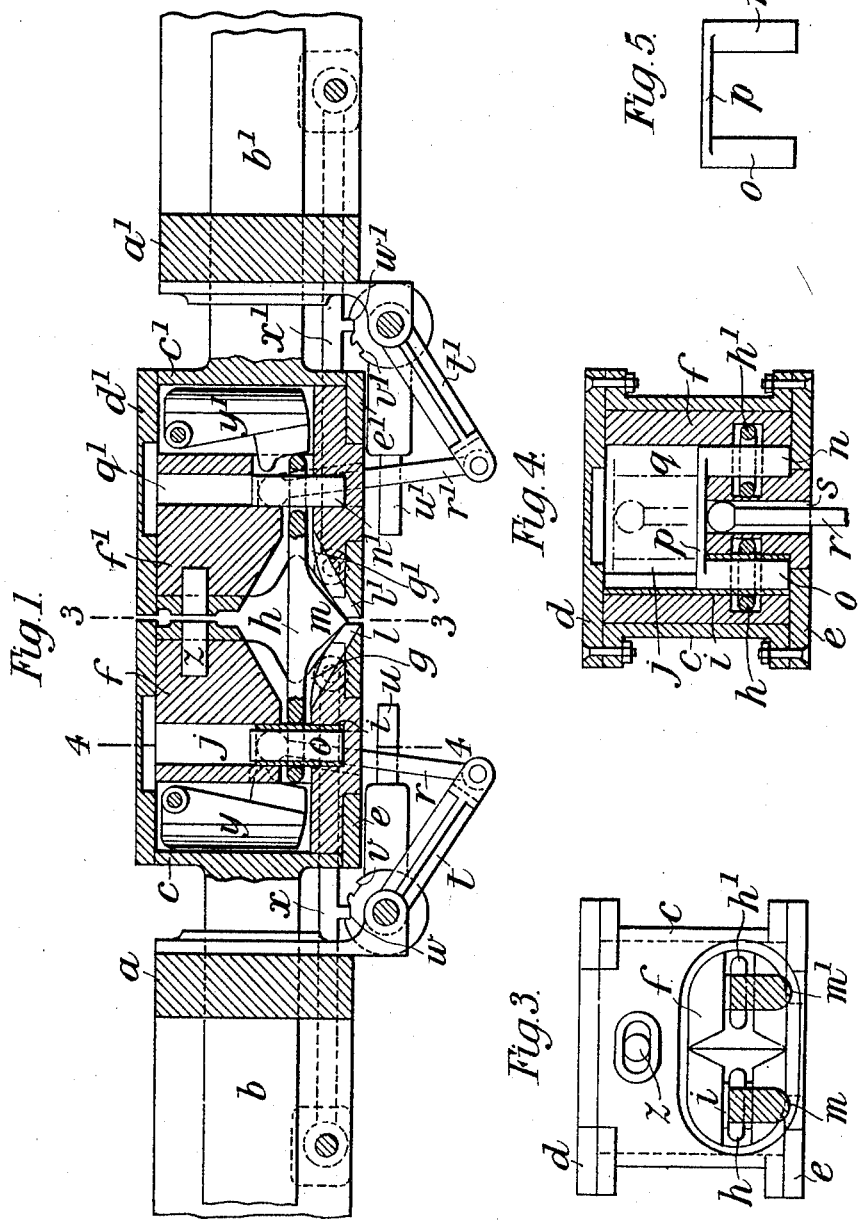
INVENTOR
John King
By Whitaker Prevost
Attys

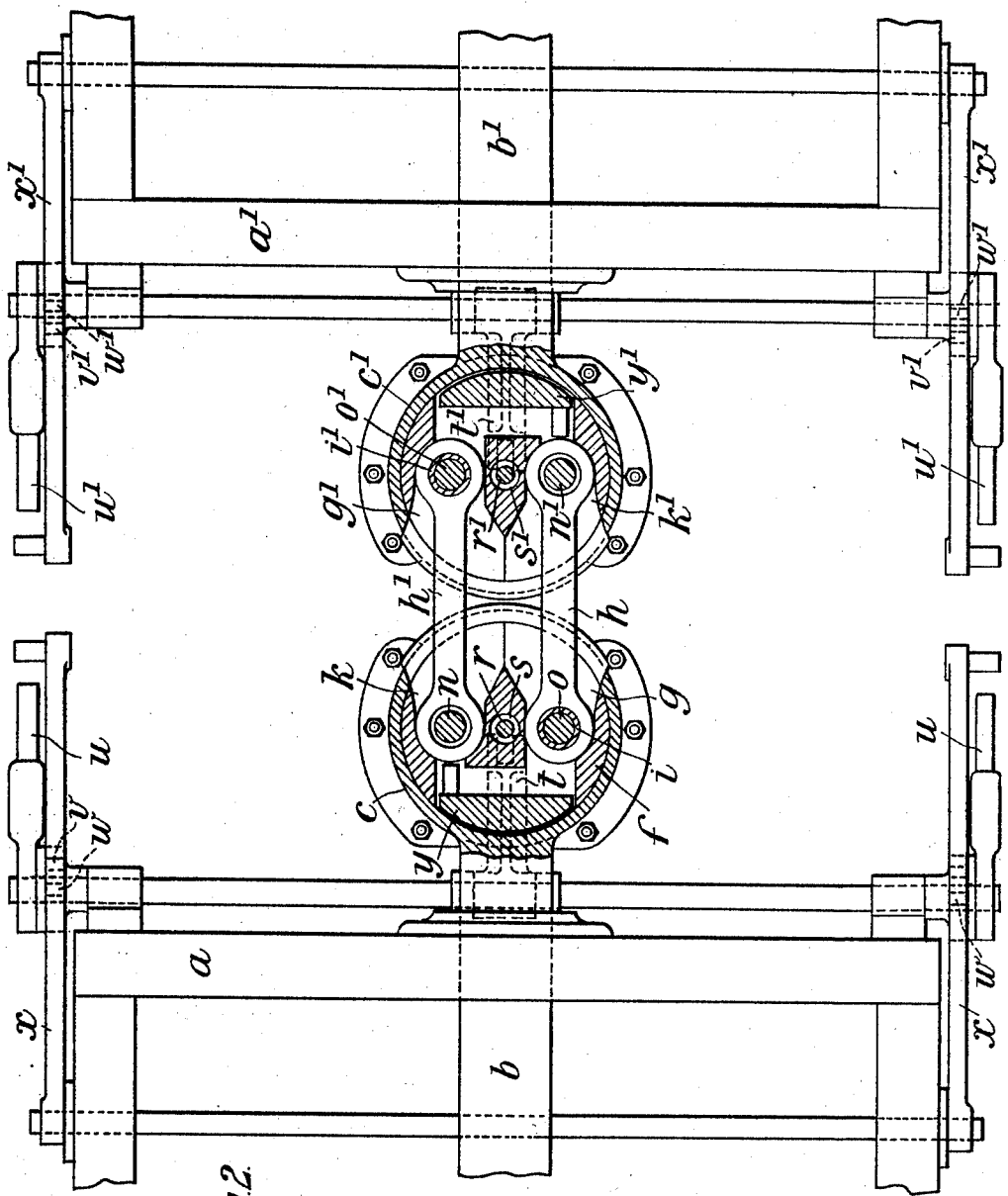

UNITED STATES PATENT OFFICE.

JOHN KING, OF VALPARAISO, CHILE.

AUTOMATIC BUFFER-COUPLING FOR RAILWAY-VEHICLES.

1,335,061.  Specification of Letters Patent.  Patented Mar. 30, 1920.

Application filed September 15, 1919. Serial No. 323,961.

*To all whom it may concern:*

Be it known that I, JOHN KING, a subject of the King of Great Britain, residing at Casilla 2ª, Valparaiso, Chile, have invented new and useful Improvements in Automatic Buffer-Couplings for Railway-Vehicles, of which the following is a specification.

This invention relates to automatic buffer couplings for railway vehicles, and to that class of such coupling wherein each coupler head is provided with a permanent link and with a chamber or opening for receiving the end of a corresponding link on the coupler head of an adjacent wagon or vehicle the pull upon the two links of a coupling being equalized by the employment of a pivoted or swiveling member, the chief object of the said invention being to provide an improved coupling of this class wherein the parts are protected from the weather so that they will not be rendered inoperative, say by an accumulation of snow upon the coupling.

According to the said invention the draw-bar is constructed with a cylindrical box provided with caps or covers and partly open at the front, in which is fitted a cylindrical block or member capable of slight rotation in the said box, and having in it chambers into which the draft links enter, two vertical holes in which the pin for the permanent link and a sliding pin for the detachable link are respectively arranged, and a recess in which a holding up catch for the sliding pin is pivoted. The pin for the permanent link is tubular and the sliding pin is connected by a cross head to a counter part which slides in the tubular pin and acts as a balance weight when the sliding pin is raised by a lifter acting against the center of the cross head.

The invention will be understood by reference to the accompanying drawing, in which:—

Figure 1 is a sectional elevation of two coupler heads connected together to form a complete coupling, and Fig. 2 is a sectional plan of the same.

Fig. 3 is a section on the line 3—3, Fig. 1, and

Fig. 4 is a section on the line 4—4 Fig. 1.

Fig. 5 is an elevation of the coupling pin.

As the construction of the two coupler heads is identical I shall only describe one of them, and I shall use the same letters of reference, with the addition of the numeral 1, for indicating corresponding parts of the other.

$a$ indicates the under frame of a vehicle, $b$ the draw-bar, which is arranged in connection with springs in any convenient manner, and $c$ the cylindrical box formed upon the end of the said draw bar and provided with caps $d$, $e$.

$f$ indicates the cylindrical block fitted within the said box and provided with the chamber $g$ in which the link $h$ is permanently retained by a tubular pin $i$ inserted into the hole $j$ and with the chamber $k$ for the reception of the free end of the link $h^1$ of an adjacent coupler head.

These chambers $g$ and $k$ are preferably formed with inclines $l$ and the links with lugs $m$, $m^1$ which coöperate with the said inclines in such a manner as to center the said links relatively to the said chambers, as described in the specification of former British Patent No. 15668 A. D. 1910.

$n$ indicates the sliding coupling pin and $o$ its counterpart connected to it by the cross-head $p$ (Fig. 5), the pin $n$ being located in the hole $q$ in the block $f$ and the counterpart $o$ in the tubular pin $i$, one side of the upper portion of the tubular pin $i$ and also the metal between the two holes $j$ and $q$ being cut away to allow the free movement of the cross-head $p$, as clearly shown in Fig. 4.

$r$ is the lifter for raising the cross-head $p$ and its pins $n$, $o$ to disengage the pin $n$ from the link $h^1$. This lifter is inserted through a hole $s$ formed in the solid portion of the cylindrical block $f$ between the chambers $g$, $k$ the said lifter being pivoted to a lever $t$ fixed to a shaft provided with an operating lever $u$ at each end. The said shaft also has fixed to it at each end, a disk having in it two notches $v$, $w$ with which a lug on a locking lever $x$, weighted at its free end, engages, the said notches corresponding with the raised and lowered positions of the locking pin $n$. The tooth between the two notches $v$, $w$ is beveled on one side so that when the lever $u$ is moved to raise the lifter $r$, the locking lever $x$ will be lifted from the notch $w$, and then drop into the notch $v$ to retain the lifter in its raised position. The locking levers $x$ on opposite sides of a wagon are fixed to a common shaft so that both disks having the notches $v$, $w$ will be simultaneously locked.

$y$ is a weighted catch pivotally carried in the cylindrical block $f$, and which, when the link $h^1$ has been withdrawn from the chamber $k$, swings beneath the coupling pin $n$ and prevents it from again dropping, notwithstanding that the lifter may have been allowed to drop, until a coupling link $h^1$ again enters the chamber $k$ and pushes the said catch backward.

$z$ is a stop stud which is fixed in the cylindrical block $f$ and projects into a slot in the box $c$, this stud serving to prevent the block $f$ from turning through too great an arc if one link of a coupling is uncoupled. Should such be the case no damage will result as the single coupled link will take the pull, although, of course, there is a much greater margin of safety when both links are engaged.

In the uncoupling of two wagons it is necessary to lift the coupling pin of each coupler head, and before two wagons can be properly coupled the pin lifters of both coupler heads must be lowered, but these double operations are so easily and quickly performed that they are not detrimental.

In practice I have found it advantageous to arrange the coupling so that the links are from six to eight inches apart and to provide for say one inch of free movement between the two coupler heads.

It will be understood that when both links of a coupling are connected the pull upon such links will be equally divided whether the wagons are running on the straight or round curves, as the cylindrical blocks will rotate in their boxes to provide for this.

Claims.

1. An automatic coupling comprising a plurality of coupler heads, each comprising a box provided with a cover, a cylindrical block inclosed and swiveled in each box and having a permanently connected link, and means located within the block detachably engaging a link of an adjacent coupler head.

2. A coupling of the kind defined in claim 1 in which the connection of the permanently connected link includes a tubular pin, a coupling pin forming the means for detachably engaging a link of an adjacent coupler head and having a counter part connected to it by a cross head, said counter part slidably engaging the tubular pin, and a lifting device engaging said cross head.

3. An automatic coupling comprising a plurality of coupler heads, each comprising a box provided with a cover and having an opening on its side, a cylindrical block inclosed in each box, movable about a vertical axis and having a permanently connected link, a pin located within the block for detachably engaging a link of an adjacent coupler head, a head fixed to the pin, and means engaging the underside of said head for lifting the same.

4. An automatic coupling of the kind defined by claim 3, in which the last named means includes a rock shaft, an arm fixed to the rock shaft, a lifter bar connected to the arm and engaging the underside of said head, a disk fixed to the shaft and provided with a peripheral notch, means for rocking the shaft, and a pivoted pawl adapted to engage the notch for holding the shaft in one position.

JOHN KING.